United States Patent [19]
Rice

[11] Patent Number: 4,724,735
[45] Date of Patent: Feb. 16, 1988

[54] BLADE TENSIONING MECHANISM FOR PARALLEL ARM SAW

[76] Inventor: Verle L. Rice, 700 S. Halsey, Harrisonville, Mo. 64701

[21] Appl. No.: 860,042

[22] Filed: May 6, 1986

[51] Int. Cl.⁴ ............................................. B27B 19/12
[52] U.S. Cl. ................................... 83/581.1; 83/784
[58] Field of Search ...................... 83/784, 581.1, 781, 83/782, 763, 818; 30/513

[56] References Cited

U.S. PATENT DOCUMENTS

| | | | |
|---|---|---|---|
| 46,015 | 1/1865 | Moyer | 83/784 |
| 164,787 | 6/1875 | Westcott et al. | 83/784 |
| 1,810,349 | 6/1931 | Green | 30/513 |
| 2,969,815 | 1/1961 | Lasar | 83/818 |
| 4,503,742 | 3/1985 | Sutton | 83/581.1 |

FOREIGN PATENT DOCUMENTS 458715 4/1928 Fed. Rep. of Germany ........ 83/784

Primary Examiner—Donald R. Schran
Attorney, Agent, or Firm—Kokjer, Kircher, Bradley, Wharton, Bowman & Johnson

[57] ABSTRACT

A blade tensioning mechanism for use with a parallel arm saw. A bolt extends between one end of the arms which are pivotably mounted along their length to the supporting framework of the saw and a saw blade is held between the other ends of the arms. A camming device is coupled with one end of the bolt and exerts a camming force on one of the arms when the device is rotated in one direction. This force caused the ends of the arms coupled with the bolt to move together and causes the other ends of the arms to spread apart, and securely hold the saw blade by tension. Rotation of the camming device in the other direction relaxes the tension force for removal and replacement of the blade.

4 Claims, 5 Drawing Figures

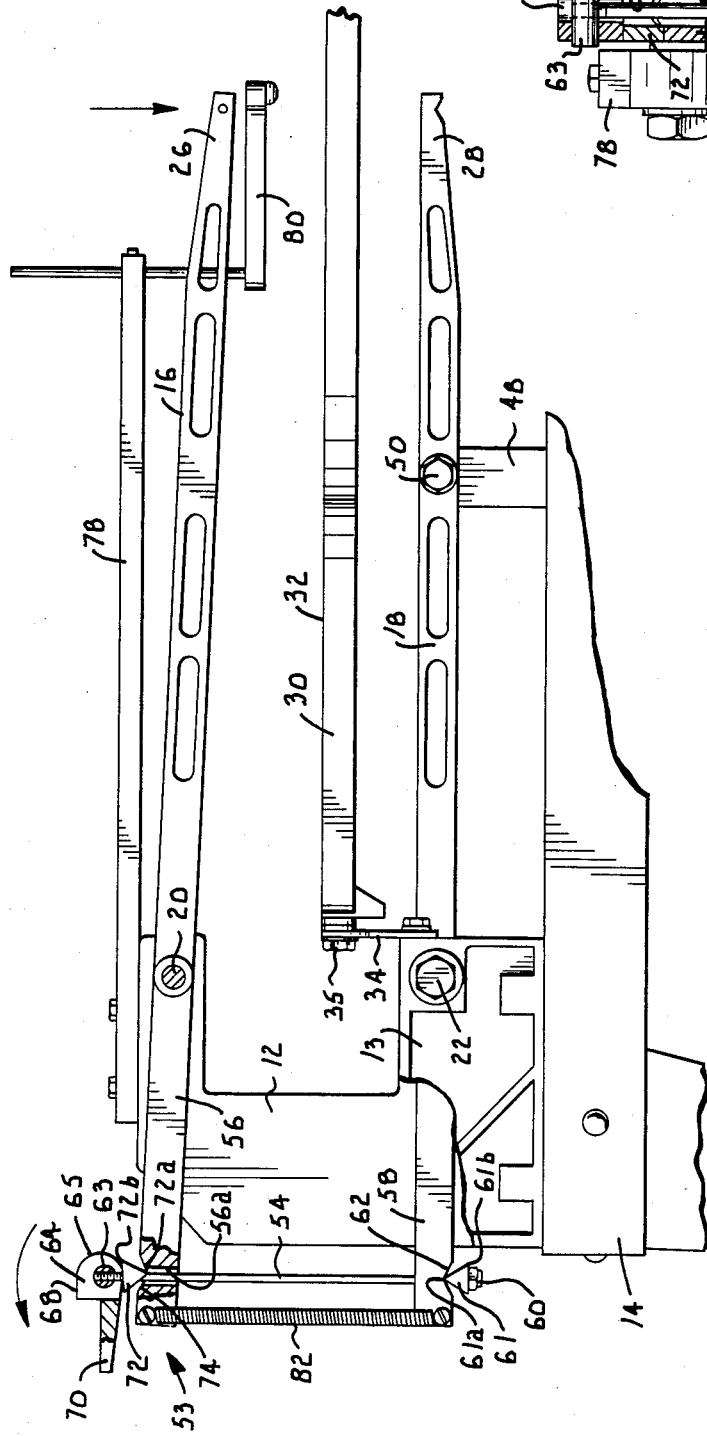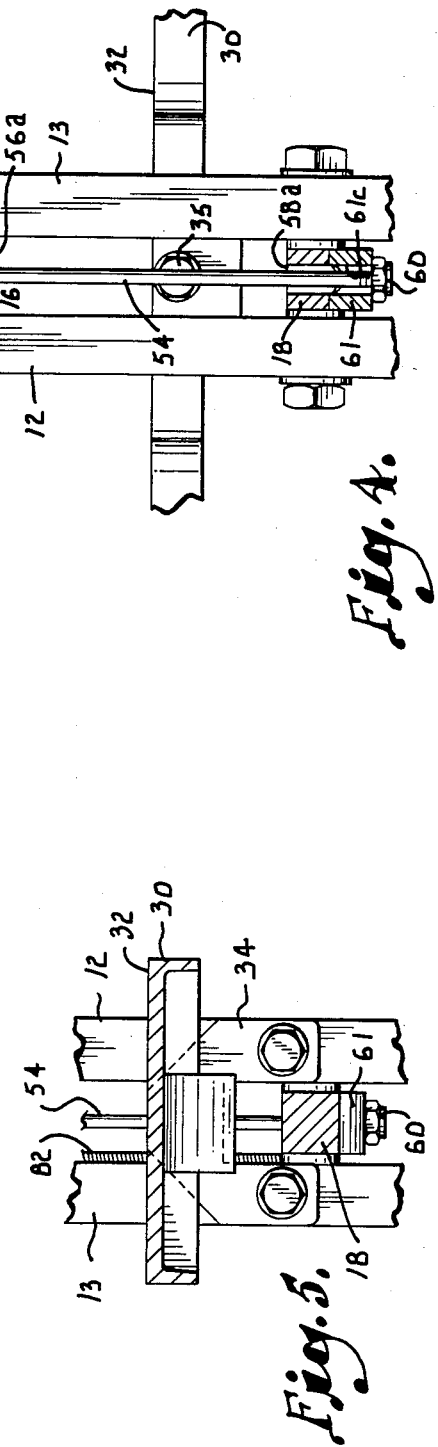

BLADE TENSIONING MECHANISM FOR PARALLEL ARM SAW

BACKGROUND OF THE INVENTION

This invention relates to parallel arm saws in general and, more particularly, to blade tensioning devices for use with parallel arm saws.

Parallel arm saws for woodworking and other crafts are well known. In the saws, parallel arms are reciprocably mounted to a framework. A saw blade is held between the arms at one end and a mechanism for tensioning the saw blade moves with an up and down motion and a work piece resting on the working surface may be cut by engaging the blade.

One type of blade tensioning mechanism known in the prior art comprises a wedge resting in a groove on th upper surface of the upper arm, a wedge resting in a groove on the lower surface of the lower arm, a bolt passing through both arms and both wedges, a nut threaded on one end of the bolt and a knob threaded ont he other end. When the saw blade is in place, the nut and knob are tightened against the wedges and force the arms toward each other. This forces the arms apart at the other end, causing the saw blade to be held firmly between the arms by tension. Replacing the blade when this type of tensioning mechanism is used can be time consuming as the tension in the blade must be released by loosening the knob. After the old blade is removed and a new blade is inserted, the knob must be tightened down against the wedge in order to create a tension force in the blade. As the knob is being turned, the tension in the new blade must be repeatedly checked to make sure an excessive tension force does not damage the blade. Undue looseness of the blade can likewise lead to damage to the blade and other components. Vibration can also loosen the knob and thus relax the blade tension gradually during operation of the saw.

SUMMARY OF THE INVENTION

The blade tensioning mechanism of the present invention comprises a rotatable camming device coupled with one end of a bolt which extends between the arms of a parallel arm saw at the ends of the arms opposite the saw blade. The camming device when rotated in one direction causes the arms to move toward each other at the end distant from the saw blade and causes the arms to move apart at the other end. This causes the saw blade to be maintained under tension. When the camming device is rotated in the other direction, the tension in the saw blade is relaxed and the blade may be removed and replaced.

It is an important object of the present invention to provide, in a parallel arm saw, an improved blade tensioning mechanism which allows the saw blade to be changed more quickly and easily than is possible in prior tensioning mechanisms.

Another important object of the invention is to provide a blade tensioning mechanism which applies a repeatable tensioning force to the saw blade.

A further object of the invention is to provide a blade tensioning mechanism of the character described which is constructed in a simple and economical manner and which acts reliably to maintain the blade tension even after prolonged use.

An additional object of the invention is to provide a blade tensioning mechanism of the character described which is able to maintain the proper blade tension without loosening due to vibration and other forces that are encountered in normal use of the saw.

These and other objects of this invention will become apparent from the following description and claims when read in light of the attached drawings.

BRIEF DESCRIPTION OF THE DRAWINGS

FIG. 3 is an enlarged fragmentary side elevational view similar to FIG. 1, but showing the tensioning mechanism in its release condition to permit removal and replacement of the saw blade;

FIG. 4 is a fragmentary sectional view taken along line 4—4 of FIG. 1 int he direction of the arrows; and FIG. 5 is a fragmentary sectional view taken along line 5—5 of FIG. 1 in the direction of the arrows.

DESCRIPTION OF THE PREFERRED EMBODIMENT

Figure 1:
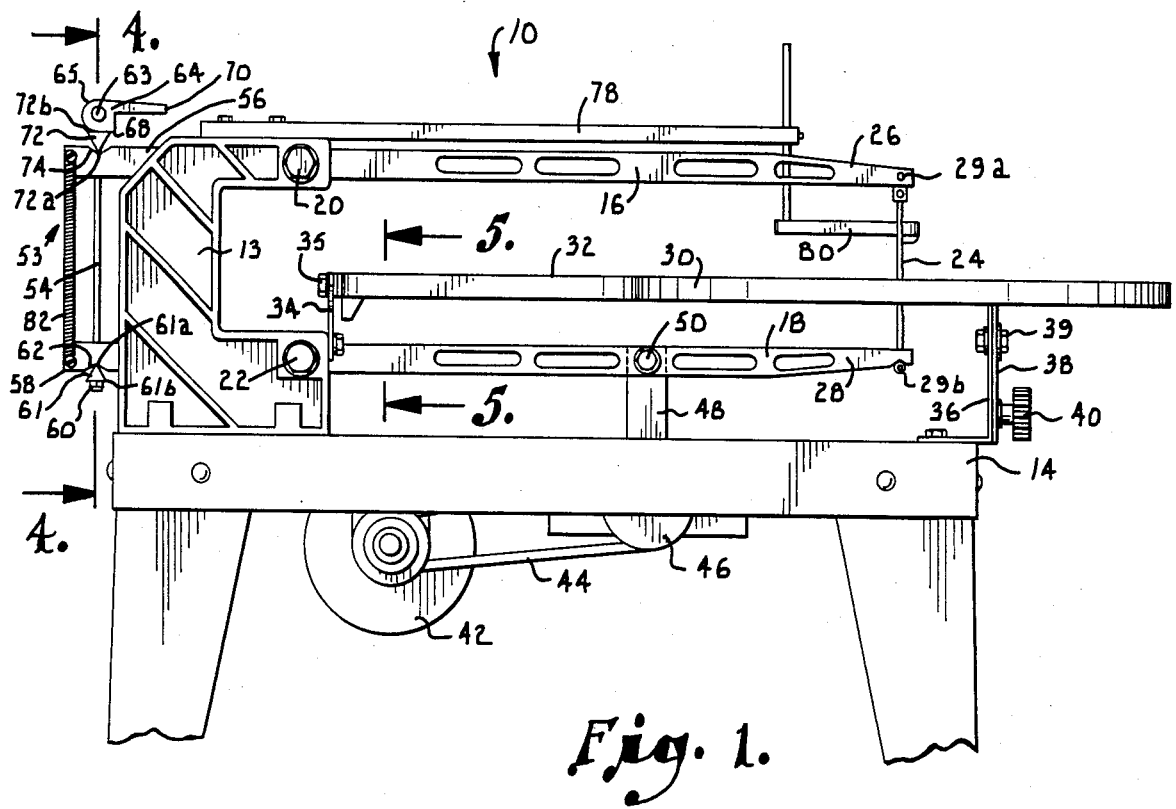
FIG. 1 is a side elevational view of a parallel arm saw which is equipped with a blade tensioning mechanism constructed according to the present invention, with the saw blade held under tension.
Figure 2:
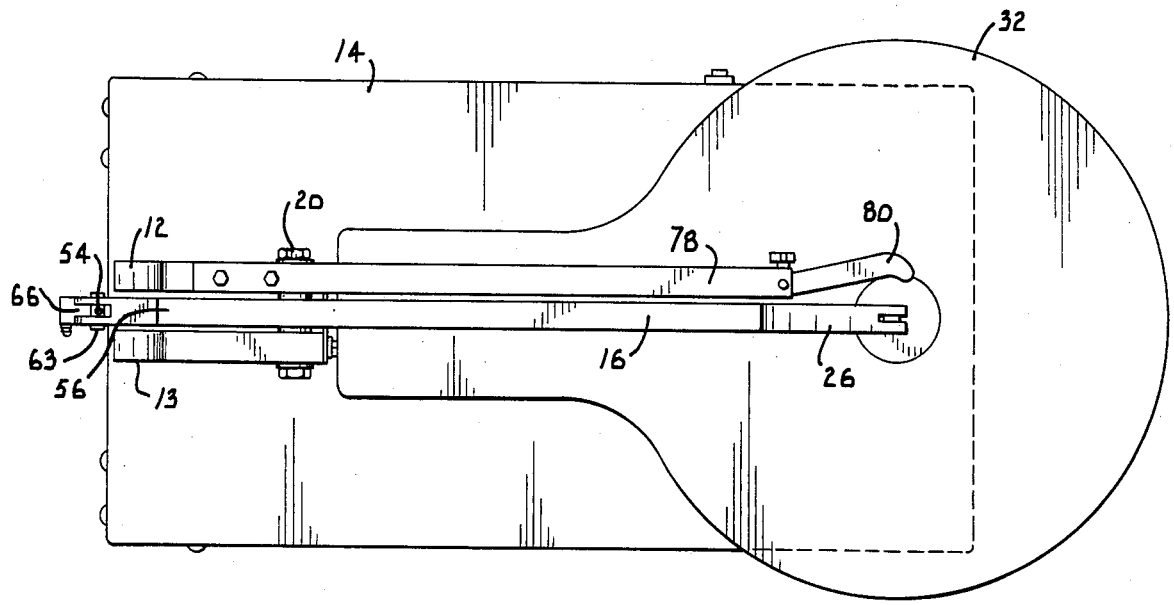
FIG. 2 is a top plan view of the saw shown in Fig. 1.

Referring now to the drawings in more detail, numeral 10 generally designates a parallel arm saw of the type to which the blade tensioning mechanism of the present invention is applicable. Two C-shaped mounting members 12 and 13 (see FIGS. 4 and 5) are mounted on a supporting framework 14 for the saw. Upper and lower arms 16 and 18 are pivotably mounted between mounting members 12 and 13 by pivot pins 20 and 22, respectively. Arms 16 and 18 are substantially parallel and are pinned to the mounting members at locations intermediate the ends of the arms. A saw blade 24 is held between first end portions 26 and 28 of arms 16 and 18. Removable pin 29a and bladeholders 29b and 29c couple the blade 24 with the upper and lower arms.

A table 30 presents a flat working surface 32 for supporting the work pieces which are cut by he saw. The back end of table 32 has a downwardly projecting bracket 34 which is secured to mounting member 12 by a screw 35. Table 30 is supported near its forward end by a bracket 36 which is mounted on the framework 14. A flange 38 projects downwardly from table 30 and is secured to bracket 36 by a bolt 39. Screw 35 and bolt 39 are provided to accommodate tilting of table 30 about a horizontal axis. A knob 40 may be tightened against bracket 36 to lock table 30 at whatever tilt angle is desired. The saw blade 24 extends through table 30.

A motor 42 is mounted on framework 14 and connected by a drive belt 44 to a pulley assembly 46. A drive arm 48 is coupled at its top end with arm 18 by a pivot pin 50 and is coupled at its lower end with pulley assembly 46. The connection between arm 48 and pulley assembly 46 is eccentric to cause arm 48 to move up and down when the pulley assembly is rotated. The general construction of the saw 10 as thus far described is conventional.

In accordance with the present invention, the saw blade 24 is maintained under tension by a blade tensioning mechanism generally designated by numeral 53. The blade tensioning mechanism 53 includes a rigid vertical bolt 54 which extends between the end portions 56 and 58 of the respective arms 16 and 18. End portions 56 and 58 are opposite the end portions 26 and 28 which receive the saw blade 24. As best shown in FIG. 4, end portions 56 and 58 of the arms are provided with passages 56a and 58a, respectively, and bolt 54 extends loosely through the passages. The lower end of bolt 54 is threaded and receives a lock nut 60 which is adjustably positioned against a wedge 61. The wedge 61 tapers to a point or line 61a which is received in a notch 62 found in the lower surface of the lower arm 18 at end portion 58. Wedge 61 has a flat surface 61b opposite the point 61a, and the lock nut 60 is positioned against surface 61b. Wedge 61 is provided with a passage 61c (FIG. 4) through which bolt 54 loosely passes.

The top end of bolt 54 is threaded into a transverse pin 63 which is oriented horizontally or perpendicular to the longitudinal axis of bolt 54. An eccentric cam 64 is mounted on pin 63 for rotation about the pin axis through a 180° arc between the fully tensioned position shown in FIG. 1 and the relaxed position shown in FIG. 3. Cam 64 has a curved cam surface 65 which is arranged eccentrically about the pin 63. A slot 66 extends into cam 64 to accommodate bolt 54 as the cam is rotated on pin 63. A flat surface 68 is formed on cam 64 adjacent the high point of the cam surface 65. The flat surface 68 faces downwardly in the tensioned position (FIG. 1) and upwardly in the relaxed position (FIG. 3). A handle 70 extends from cam 64 to facilitate turning of the cam between the tensioned and relaxed positions. The eccentricity of the cam surface 65 is such that the portion located near handle 70 is closer to pin 63 than the portion located near the flat surface 68.

A wedge 72 is interposed between cam 64 and end portion 56 of arm 16. Wedge 72 tapers to a point or line 72a which is received in a notch 74 formed in the upper surface of arm 16 at end portion 56. Opposite the point 72a, wedge 72 has a flat surface 72b against which cam 64 acts. Bolt 54 extends loosely through a passage 72c (FIG. 4) formed through wedge 72.

An arm member 78 is mounted on member 12 and mounts a movable foot 80 for holding a work piece during operation. A spring 82 is coupled with end portions 56 and 58 to dampen the movement of arms 16 and 18 when the blade 24 is not in place.

In operation, arms 16 and 18 are reciprocated about pivot pins 20 and 22, respectively, as motor 42 drives pulley assembly 46. The reciprocating motion is created as the pulley assembly rotates and causes arm 48 to move with an up and down motion, creating a similar movement in arm 18. Arm 16 moves in unison with arm 18 when blade 24 connects the first end portions 26 and 28 of the arms and bolt 54 couples the second end portions 56 and 58 of the arms. This movement causes the blade 24 to move with an up and down motion and a work piece may be cut by resting on surface 32 and engaging blade 24. As arms 16 and 18 reciprocate, the wedges 61 and 72 rock in notches 62 and 74 on the points 61a and 72a so that bolt 54 remains in a vertical orientation.

In order to maintain blade 24 under tension, cam 64 is rotated to the position shown in FIG. 1. In this position, the flat surface 68 of cam 64 engages the flat upper surface 72b of wedge 72. Since the flat surface 68 is more distant from pin 63 than the remainder of the cam surface, the upper wedge 72 and lower wedge 61 are squeezed together, and this squeezing is transferred to arms 16 and 18 by the wedges, resulting in the end portions 56 and 58 being forced toward each other. As end portions 56 and 58 are squeezed together, the opposite end portions 26 and 28 are forced apart and the saw blade is then maintained under tension between the end portions.

Removal of blade 24 may be accomplished by rotating cam 64 about pivot pin 63 to the position shown in FIG. 3. In this position, the low point of cam surface 65 faces wedge 72, and the tension in bolt 54 is thus relaxed. This allows the end portions 56 and 58 of arms 16 and 18, respectively, to move apart and allows the first end portions 26 and 28 to move together, releasing the tension in blade 24. Blade 24 may then be removed and replaced with a new blade. The new blade may be placed under the proper tension simply by using handle 70 to rotate the cam 64 to the position shown in FIG. 1. As cam 64 approaches the fully tensioned position of FIG. 1, the cam surface 65 acts against wedge 72 by camming action to gradually increase the tension in blade 24 until the blade eventually reaches the proper tense condition for operation of the saw. It can be seen that this method of tensioning a blade is advantageous in that after tension in a blade has been relaxed, it can be quickly returned by simply rotating the camming element.

If the cam 64 does not provide the proper tensioning force when in the fully tensioned position, the cam 64 may be rotated to the relaxed position and then turned on the threaded rod to adjust the tension. The blade can then be tensioned by simply rotating the cam 64 to the position shown in FIG. 1.

It is to be noted that the provision of the flat surface 68 on cam 64 gives the tension adjustment mechanism considerable stability in the fully tensioned position. As the mechanism is subjected to vibration and other forces during operation of the saw, the engagement between the flat suraces 68 and 72b prevents the cam from turning as could occur if only a curved surface of the cam were in contact with the wedge. Additionally, it should be noted that blade 24 is placed under the same tension force each time the cam is rotated to its fully tensioned position. Thus, the tension of the saw blade is reliably maintained at a repeatable and consistent level by the tensioning mechanism, unlike threaded arrangements where "feel" is often relied upon.

What is claimed is:

1. A blade tensioning mechanism for use with a reciprocating arm saw having pivotably mounted upper and lower arms each having first and second end portions, and a saw blade extending between said first end portions of the arms, said mechanism comprising:

a bolt extending between said second end portions of said arms and having opposite ends;

means for coupling one end of said bolt with the second end portion of one of said arms;

a block engaging the second end portion of said other arm in a manner to rock thereon during reciprocation of said arms, said block presenting a substantially flat surface;

a rotatable cam mounted on the opposite end of the bolt for rotation between a fully tensioned position and a relaxed position, said cam having an eccentric cam surface acting against said block by camming action to squeeze said second end portions of the arms together to maintain the saw blade under tension when the cam is rotated in a first rotational direction toward the fully tensioned position of the cam, said cam surface allowing movement of said second end portions of the arms apart to relax the tension of the blade when the cam is rotated in a second rotational direction opposite said first direction toward the relaxed position of the cam;

a substantially flat surface on said cam adjacent said cam surface at a location and orientation to lie flatly against said flat surface of the block in the fully tensioned position of the cam, thereby resisting movement of the cam away from the fully tensioned position when the cam is subjected to vibrational forces during reciprocation of the arms when the saw is operated, said flat surface acting against said block in a manner to prevent rotation of the cam beyond said fully tensioned position in said first rotational direction; and a handle projecting from said cam in a direction such that the weight of the handle tends to rotate the cam in said first rotational direction when the cam is in the fully tensioned position, whereby the weight of the handle resists movement of the cam away from the fully tensioned position when the cam is subjected to vibrational forces.

2. The invention as set forth in claim 1, wherein said coupling means includes:

a nut threaded on said one end of said bolt; and a second block positioned between said nut and said one arm, said second block presenting a first surface which rocks on said one arm during reciprocation thereof and presenting another surface engaged by said nut, wherein said bolt extends through said second block.

3. A reciprocating saw comprising:

a frame;

a pair of arms mounted on said frame for reciprocation about a pivot axis and each having first and second end portions;

power means for reciprocating said arms about said axes;

a working surface on said frame;

a saw blade extending through said working surface and held between said first end portions of said arms;

a bolt having a longutidual axis and opposed ends, said bolt being coupled at one end with said second end portion of one of said arms and extending through said second end portion of the other of said arms;

a block engaging the second end portion of said other arm in a manner to rock thereon during reciprocation of said arms, said block presenting a substantially flat surface;

a rotatable cam mounted on the opposite end of the bolt for rotation through an arc of substantially 180° between a fully tensioned position and a relaxed position, said cam having an eccentric cam surface acting against said block by camming action to squeeze said second end portions of the arms together to maintain the saw blade under tension in the fully tensioned position of the cam, said cam surface allowing movement of said second end portions of the arms apart to telax the tension of the blade in the relaxed position of the cam; and a substantially flat surface on said cam adjacent said cam surface at a location and orientation to lie flatly against said flat surface of the block in the fully tensioned position of the cam, thereby resisting movement of the cam away from the fully tensioned position when the cam is subjected to vibrational forces during reciprocation of the arms when the saw is operated.

4. In a reciprocating arm saw of the type including a frame, upper and lower arms each having first and second end portions and top and bottom surfaces, means for mounting the arms on the frame for reciprocation about generally horizontal axes located between the end portions of the arms, a working surface on the frame, a saw blade extending through said working surface on the frame, and a saw blade extending through said working surface and held between the first end portions of the arms, the improvement comprising:

a bolt having opposite ends and a longitudinal axis, said bolt extending through said second end portion of the upper arm at one end and being coupled with said second end portion of the lower arm at the other end;

a pivot pin on said one end of the bolt positioned perpendicular to said longitudinal axis of the bolt;

a block engaging the second end portion of said upper arm in a manner to rock thereon during reciprocation of said arms, said block presenting a substantially flat surface;

a rotatable cam mounted on said pivot pin for rotation through an arc of substantially 180° between a fully tensioned position and a relaxed position, said cam having an eccentric cam surface acting against said block by camming action to squeeze said second end portions of the arms together to maintain the new blade under tension when the cam is rotated in a first rotational direction toward the fully tensioned position of the cam, said cam surface allowing movement of said second end portions of the arms apart to relax the tension of the blade when the cam is rotated in a second rotational direction opposite said first direction toward the relaxed position of the cam;

a substantially flat surface on said cam adjacent said cam surface at a location and orientation to lie flatly against said flat surface of the block in the fully tensioned position of the cam to prevent movement of the cam beyond the fully tensioned position in said first rotational direction, thereby resisting movement of the cam away from the fully tensioned position when the cam is subjected to vibrational forces during reciprocation of the arms when the saw is operated; and a handle projecting from said cam in an orientation to extend substantially horizontally from the cam in opposite directions in the fully tensioned and relaxed positions of the cam, said handle being oriented with its weight acting to rotate the cam in said first rotational direction when the cam is in the fully tensioned position whereby the weight of the handle resists vibration induced displacement of the cam away from the fully tensioned position.

* * * * *